May 28, 1963 T. A. HUTSELL 3,091,366
BEER DISPENSER

Filed July 18, 1960 7 Sheets-Sheet 1

INVENTOR.
THOMAS A. HUTSELL
BY Smith + Tuck
ATTORNEYS

May 28, 1963 T. A. HUTSELL 3,091,366
BEER DISPENSER
Filed July 18, 1960 7 Sheets-Sheet 2

FIG__5

INVENTOR.
THOMAS A. HUTSELL
BY
Smith + Tuck
ATTORNEYS

FIG_6

May 28, 1963  T. A. HUTSELL  3,091,366
BEER DISPENSER
Filed July 18, 1960

FIG_7

INVENTOR
THOMAS A. HUTSELL
BY Smith & Tuck
ATTORNEY

FIG_11

United States Patent Office 3,091,366
Patented May 28, 1963

3,091,366
BEER DISPENSER
Thomas A. Hutsell, Sedro Woolley, Wash.
(1220 Carpenter St., Mount Vernon, Wash.)
Filed July 18, 1960, Ser. No. 43,626
7 Claims. (Cl. 222—36)

This present device relates to the general art of devices intended for the measuring and dispensing of effervescent beverages. More particularly this invention relates to a beer dispensing device for dispensing draught beer. Means are provided in this present device to automatically dispense a measured amount of beer and the device is further capable for adjustment so that the desired amount of head of foam can be supplied as a part of the measured amount even though the beer in the dispensing keg may have physical properties quite different from that of the beer in the keg to which the device was previously connected.

In the past many attempts have been made to provide a mechanical dispenser for beer which would dispense an exact measured amount and which would have within the machine means for controlling those physical characteristics of the beer which normally make it difficult to dispense the draught beer in a uniform and predetermined manner, as it is drawn into a drinking glass. Considerable difficulty has been experienced in creating such a machine because of the wide differences in the characteristics of the various beers and the conditions under which it is dispensed. It is very desirable from the standpoint of fairness to the customer and to the tavern owner that an exact amount of beer be dispensed and that an acceptable head of foam be provided to make the drink appetizing in appearance. The amount of foam formed upon the beer when drawn into a glass at a given temperature is largely determined by the amount of turbulence in the beer which may be caused either by the velocity of flow or be created by wire drawing at some point in the dispensing system. This "wire drawing" may be caused by restricted orifice, sharp edges, or rough surface conditions. Velocity and turbulence in the beer may be controlled by passing the beer through sufficient length of tubing or similar passageway. By varying the length of this passageway, through which the beer passes, to suit the condition of the beer, which may vary in quality, temperature, or pressure, an accurate method is provided for controlling the turbulence of the beer.

Another condition which increases the problem of obtaining uniform results from a mechanical dispenser of beer is the fact that a certain amount of beer must be left within the machine after a glass or a number of glasses have been drawn and this beer may be under quite different conditions than that of the keg from which it is being dispensed. This is particularly true if there is a reasonable waiting period between serving customers. The principal differences in the conditions reside in the temperature and the pressure under which it is held. In my present beer dispensing device I make use of some of the proven techniques shown in my U.S. Patent No. 2,568,632. However, in this present device I employ quite different means to achieve my ends from those shown in my former patent and I overcome many of the deficiencies noted in former devices of this order as well as in my own former patent. It is therefore believed that in this present beer dispensing device I have solved many of the perplexing problems incidental to dispensing draught beer in a uniform manner under the conditions normally encountered in a public drinking establishment.

The principal object of my invention, therefore, is to provide a beer dispensing device which will dispense a measured quantity of beer and deposit it in the serving glasses with a uniform head of foam on each successive glass.

A further object of this invention is to provide a dispensing device having variable means, capable of modifying varying service conditions to achieve uniformity in the head of foam.

A further object of this invention is to provide cooling means and pressure equalizing means which will insure that the beer that has been left in the dispenser for a considerable period will be dispensed in a condition similar to that of beer that is being drawn directly from the dispensing keg.

Further objects, advantages and capabilities will be apparent from the description and disclosure in the drawings, or may be comprehended or are inherent in the device.

Referring to the drawings throughout which like reference characters indicate like parts the numeral 1 indicates the measuring cylinder having a top 1a and enclosing wall portion 16. This cylinder is fitted with a fabricated piston 2 having the annular cup-shaped resilient packing 3 which is clamped to piston 2 and beveled to form a full engagement with the inner wall of cylinder 1. Centrally disposed with respect to piston 2 is the beer passageway and the closure or bypass valve 4 disposed to open and close this opening in accordance with the cycling of the device in the measuring and delivery of each glass of beer. Valve 4 is provided with a valve stem 4a and around this valve stem is disposed the compression spring 5 which is biased to normally open valve 4. As the valve normally is working in a chamber filled with beer, packing means is provided at 6 to contain the beer and prevent it working out along stem 4a. Valve 4 is operated by valve stem 4a which is in turn closed by an air or other gas operated diaphragm assembly 7. Valve 4 and piston 2 move up and down within the confines of cylinder 1 and as the diaphragm assembly 7 operates valve 4 it must move with the piston assembly. A piston stem in the form of a tube 2a disposed around valve stem 4a operatively connects piston 2 and the housing for diaphragm 7 so that they will at all times move together as a unit. The housing for diaphragm 7 is formed of two dished members 7a and 7b having peripheral flanges which enclose and position diaphragm 7 by engaging the peripheral flange thereof. This housing is provided with a guide 7c engaging one of the assembly rods 47 to prevent twisting of the assembly and has secured to it valve assembly 8 which is best referred to as the charging valve, since during the dispensing operation this valve distributes compressed air to certain of the functional parts which will be described later. Additionally, diaphragm assembly 7 carries the air distributing means and as this distributor must in turn move with piston 2, the functional parts are largely connected by flexible tubing such as an impervious rubber or plastic tube which will accept a good degree of flexing which occurs during each cycle of operation. Certain parts operated by the pivoted bar 9 and the vent valve 10 are also carried by the housing for diaphragm 7 including the shifting posts 11 which are moved by push button assemblies 12 and 12a. The counter selector and operating assembly, shown generally at 13, moves vent valve 10 so that it will register with the appropriate quantity stop 14.

Disposed coaxially with piston stem 2a is the piston return bellows 15 which is made gas tight at its lower end by packing 16 and flanges 17 and 18 disposed at the lower and upper ends of bellows 15 and further by the O ring 19 which encircles the piston stem and answers as an upper packing along the stem. The top plate 20, which secures the upper flange 18, is fitted with a gas tube connection 21, check valve 22 and a return orifice 23 which are contained within check valve disc 24. Beer tube 25 connects the beer keg with the top of the metering cylinder and above piston 2. During operation beer enters the foam control passage orifice 26 which connects the bottom of the cylinder 1 and the coil selector adjustment passage 27. The adjustment passage connects with each spiral passageway of the foam control 28, which might be likened to a coil of pipe or tubing. Closely fitted in the bore of rod guideway 27 is the movable rod 29, the position of which determines the available length of the spiral passageway for the beer as it is being dispensed.

The top coil or turn of the foam control passage 28 is connected with the discharge valve assembly by tube 30. In order to maintain the beer left in the machine at a predetermined temperature between servings the exposed tube 30 is fitted with a cooling liquid jacket 31.

The outlet valve 32 is held closed against the pressure exerted by the beer by compression spring 33, which is suitably positioned so as to always bias valve 32 in the direction of the closed position. The outlet valve stem is sealed by the packing 34 so as to prevent any loss of beer or pressure at this point. The valve stem 32a is drilled its entire length to provide the air vent 35, thus insuring the free flow of beer through tube 30 and out nozzle 36 so that it will be discharged into the serving glass G through nozzle 36 without turbulence being created at this point. The outlet valve 32 is air operated by means of diaphragm 37 which is returned to the inoperative position when the air pressure is released by the diaphragm return spring 38.

Figure 8:
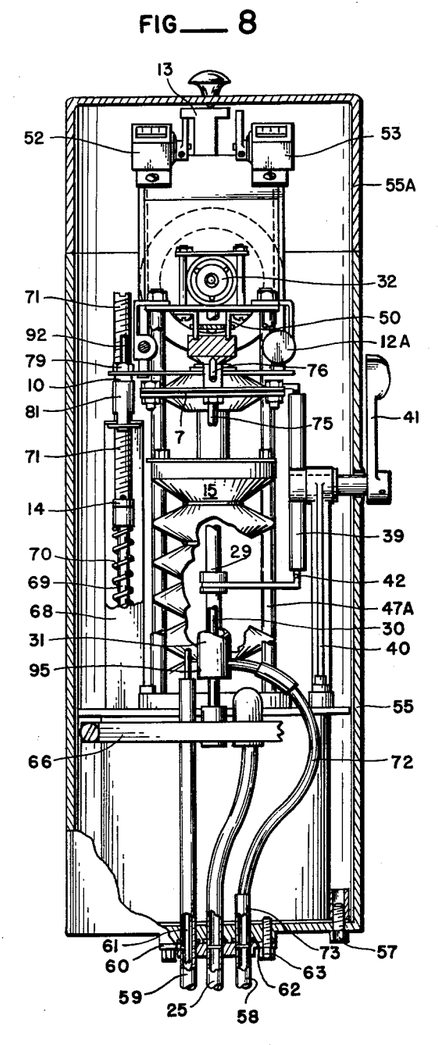
FIGURE 8 is a vertical cross-sectional view with certain parts broken away and others shown in section, to illustrate structures not clearly shown in FIGURES 6 and 7.
Figure 10:
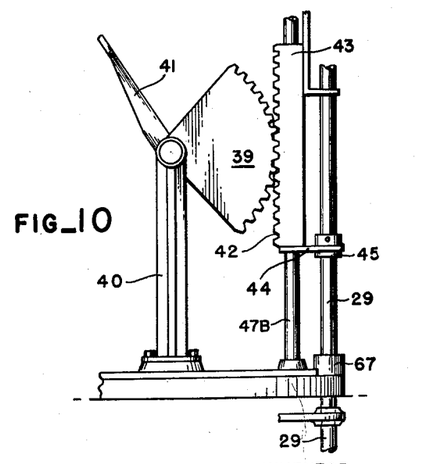
FIGURE 10 is a fragmentary vertical view illustrating certain essential parts employed in the foam control adjusting means.

Referring to FIGURES 8 and 10 of the drawings the foam adjusting and controlling means is illustrated. This is, in effect, a control means for positioning rod 29 so as to shorten or lengthen the actual portion of the spiral passageway 28. A gear quadrant 39 is pivotably supported on a suitable axle which in turn is positioned by bracket 40. Handle 41 is secured to the axle, as will be noted in FIGURE 8, so that external adjusting means is provided for the actual manual positioning of quadrant 39. The gear teeth of quadrant 39 are disposed to mesh with and operatively control rack gear 42 and slide 43 of which the rack is a portion. Slide 43 is attached to rod 29 by yoke means 44, the free end of which engages a groove in collar 45 which is in turn fixedly secured to rod 29.

A bracket 46 serves as a cover for certain interior portions of the mechanism and is supported by four rods, 47, 47a, 47b and 47c, which are threaded into bosses on top of the cylinder casting. Two of them, 47a and 47b, form guides for the piston assembly as it moves up and down during each cycle of operation by passing through guide holes in extensions of plate 20 and in the housing for diaphragm assembly 7. One of these rods also serves as a guide for the rack gear as previously noted. Bracket 46 forms a support means for several elements and especially for the outlet valve assembly and brackets 49, which form bearings for the push button rod assemblies 12 and 12a. Bracket 46 also forms a support for hinge brackets 50, the operating lever 51, counters 52 and 53 and the upper guide 54 for the foam control rod 29.

The water jacket 55, which encloses the bulk of the working parts of my dispenser, is preferably formed of plastic material. This also includes the cylinder bottom 56 so that minimum transfer of cold will be possible and thus there will be no visible tendency for the outside of the dispenser to sweat as might easily occur if it were formed of metal. The metering cylinder 1 is provided with a plurality of bosses. Cap screws, passing through the base portion 56, engage these bosses so as to hold the various parts in fixed relationship to each other. One of these hold-down cap screws is shown in FIGURE 8.

Referring specifically to FIGURE 8 it will be noted that the beer line 25, the water inlet tube 58 and the water return tube 59 all extend through bottom 56 passing through close fitting holes in the plastic case and are additionally sealed by O rings 62 or similar means having the positioning and securing plate 60 and a plurality of cap screws 63, which hold it in operational position. Plate 60 serves as a joining means so that the tubing inside the beer dispenser can be permanently installed and the service tubing then connected thereto. Consequently, to these ends the corresponding service tubes are externally connected to plate 60, which additionally carries air tube 61 which passes through the water return tube 59.

Figure 11:
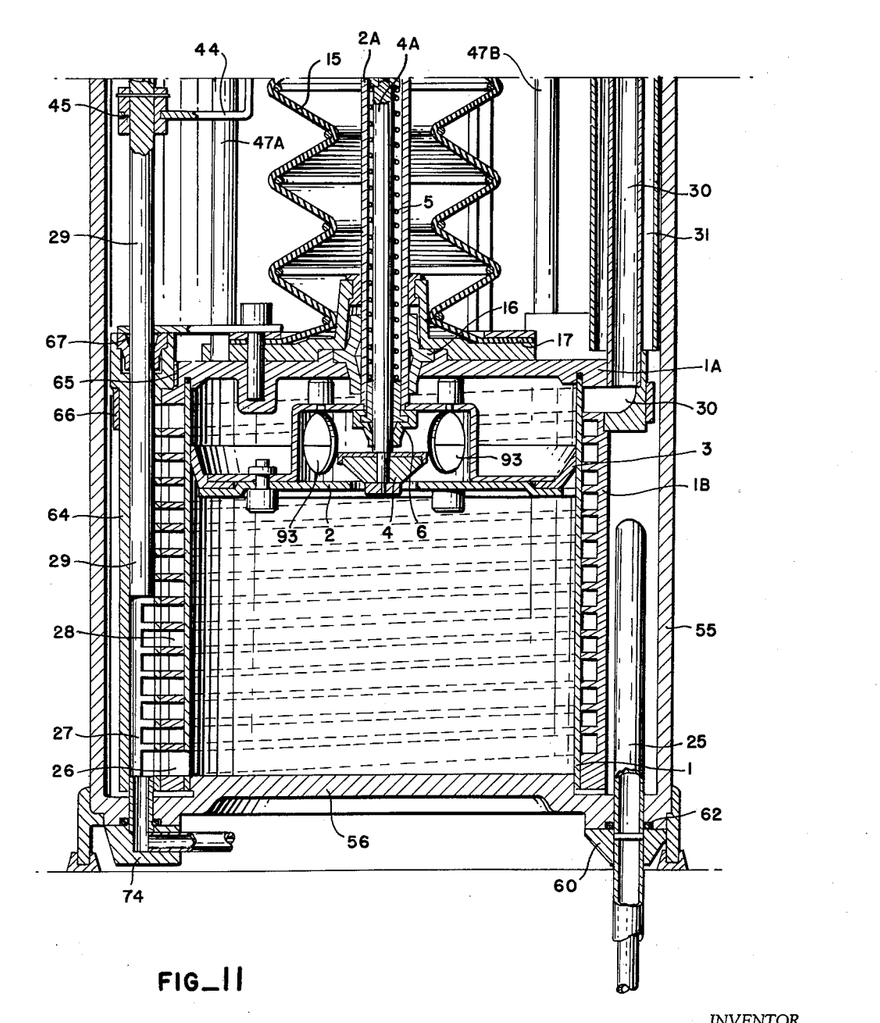
FIGURE 11 is a fragmentary vertical cross sectional view showing the lower portion of my dispensing device with the piston employed therein at the upper end of its stroke.

Coil length adjustor or selector assembly 64, shown in FIGURE 11, is sealed to the cylinder casting by a vertically positioned gasket 65 and is held in place with a plurality of straps, one of which is shown at 66. The coil length selector rod 29 is sealed at the upper end of passageway 27 by packing 67.

Figure 9:
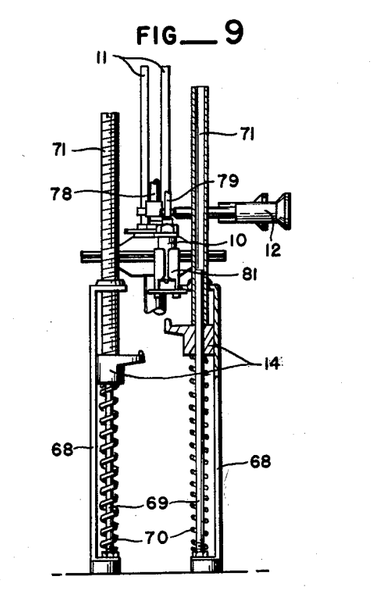
FIGURE 9 is a fragmentary vertical cross-sectional view illustrating the quantity stops and operating means therefor.

Referring particularly to FIGURE 9 it will be noted that brackets 68 are provided for the quantity control stops 14. These are attached by means of nuts on guide rods 69 which rods are fitted with the compression springs 70. Adjustment of the position of stops 14 is made by removing housing cover 55a and turning the threaded tubes 71 which are threaded through right angle bosses formed in the upper ends of brackets 68. These tubes press against stops 14 and form the positioning means therefor. 72 is the permanently installed extension of water tube 58 and is provided with a discharge hole of reduced size over the diameter of the tube so that a portion of the circulating water may pass out at the bottom of the water jacketed portion of the dispenser. 74, shown in FIGURE 11, illustrates an attachment which makes it possible to circulate cleaning solution or clear water through the spiral passageway 28 for periodically cleaning the equipment.

Valves 8 and 10 employ automotive tire valve cores as these are proven valve arrangements having their own sealing means and springs which normally bias them into a closed position. Air is supplied to valve 8 by the air line 75 and in this connection air or any suitable gas under pressure might be used, carbon dioxide, for instance, being very acceptable. Similarly diaphragm 7 is supplied by the gas line 87, and the vent valve 10 is supplied by line 92. Diaphragm 37 is supplied by air line 80. The vent valve 10 is normally actuated by the movable sleeve 81, shown in FIGURE 8. The outlet nozzle 36 and its associated parts are attached to bracket 46 by a clamp 82 for easy removal, when occasion requires as in servicing or cleaning.

The counter selector and operating mechanism is provided with the long extension spring 83 which serves to restore this mechanism if a different selection is made through the use of push buttons 12 or 12a. The pneumatic operating system is supplied by gas under pressure through the pressure line 87 and the distribution of this air will probably be best understood from a study of FIGURE 12. A branch of line 87, indicated at 88, is the pressure line to the piston return bellows 15. The line extends upwardly through valve 8 where the valve controls the flow of gas in accordance with the actuation of lever 51. This lever is generally actuated by the rim of the drinking glass as it is slipped up around the discharge nozzle 36. The output of valve 8, line 89, terminates in a four-way distributor fitting 90. From this fitting fluid line 91 supplies gas under pressure to diaphragm 37.

Line 92 is the gas tube connecting the four-way fitting 90 with vent valve 10 passing through fitting 79. 93 indicates ports used in association with bypass valve 4 to provide for the passage of beer from the upper portion of cylinder 1 to the lower portion of the same.

*Method of Operation*

Figure 12:
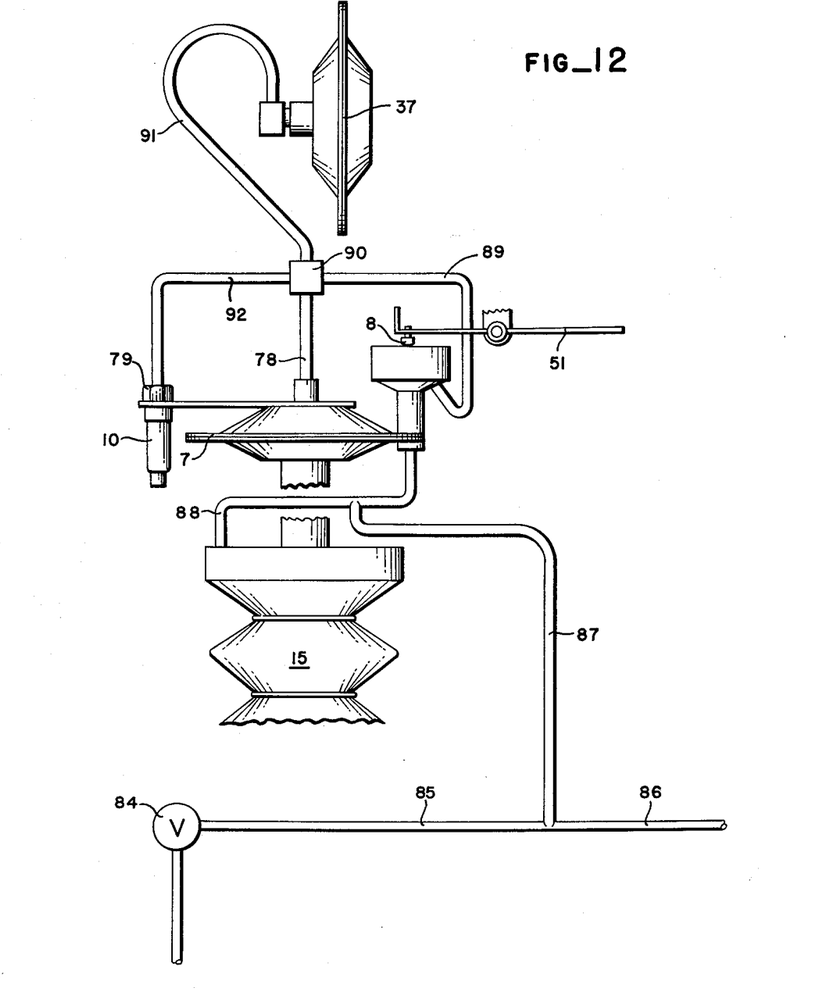
FIGURE 12 is a vertical diagrammatic view illustrating certain essential operational equipment and the routing of the pressure gas line which provides the energy essential for the sequential operation of the various elements employed in one cycle of operation.

This present equipment is normally employed in the place of the regular dispensing taps and it must of necessity make use of the usual beer line connected to the beer line 25 of this present device and a tap rod which is common in dispensing draught beer from kegs. A source of either compressed air or gas such as $CO_2$ under pressure in addition to the pressure normally supplied by the beer keg is required to cause the functioning of the various parts of this equipment. It is further necessary that steps be taken to refrigerate all those parts of this present equipment that normally come in contact with the beer between the time it is drawn from the keg and the time it leaves the dispensing nozzle 36. Normally a reservoir containing water or other suitable fluid fitted with a simple pump driven by electric motor is placed in a suitable position in the refrigerating cabinet usually present with beer serving equipment. These parts are not shown in the present illustrations as they are normal complements of such equipment. The discharge of the refrigerant from the pump is attached to tube 58, reference now being made to FIGURE 8 of the drawings. Part of the coolant is discharged through orifice 73; the rest of the coolant passes through tube 72 into upper cooling jacket 31 or the outer coolant jacket 55. Jacket 31 is disposed around the beer discharge tube 30 and can thus control the delivery temperature of the beer as it flows upwardly and passes out the top of tube 31 and returns to the bottom of the plastic housing formed of parts 55 and 56. These parts form a complete enclosure for the lower portion of this device. Coolant overflow pipe 59 is connected by a tube with the coolant receptacle into which the overflow drains where it is cooled by the ambient temperature and then recirculated. This system effectively cools all the parts of the apparatus which come in contact with the beer. The air or gas under pressure flows through regulating valve 84 into tube 85 and supplies pressure to the keg through tube 86 and serves the pneumatically operated mechanism through tube 87 through which it passes to the piston return bellows 15 through tube 88. These relationships are best illustrated in FIGURE 12. Tube 88 is connected to the charging valve 8. When diaphragm 77, which actuates valve 8, is forced down by lifting pressure on the exposed end of lever 51, by the drinking glass to be filled, valve 8 is opened and the air or gas under pressure passes out and is carried through tube 89 to the four-way connection fitting 90 where it passes through tube 78 moving the large diaphragm 7. When actuated diaphragm 7 closes the bypass valve 4 in piston 2 against the pressure exerted by light spring 5. The air pressure also is exerted on diaphragm 37 through tube 91 and through tube 92 to valve 10 which is closed. Although the air pressure is equal on diaphragms 37 and 7, diaphragm 7 completes its movement first because of the relatively small resistance provided by spring 5 fitted around stem 4a of valve 4. However, when the movement of diaphragm 7 is arrested by the seating of valve 4 the continued pressure through tube 91 will overcome the combined resistance of springs 38 and 33, opening valve 32. At this stage of the operation we find bypass valve 4 is being held on its seat by pressure on diaphragm 7 and valve 32 has been opened and is being held open by pressure on diaphragm 37. As the beer that is under pressure from the keg enters the metering cylinder above piston 2 the piston will move downwardly forcing the beer through port 26 into passageway 27. The beer will follow passageway 27 until it is obstructed by the foam control rod 29. The beer will then flow through the remaining turns of the spiral passageway 28 and pass up through tube 30 into valve body 48 and will be discharged out through valve 32, which is being held open, and into the drinking glass through nozzle 36.

On the discharge cycle, while piston 2 is being forced downwardly by beer entering on top of the metering cylinder through tube 25, piston stem 2a, which is attached to piston 2, is being pulled downwardly into cylinder 1 through packing 16. The top assembly, securing the upper end of bellows 15, which consists of the casting 24, plate 20 and the O ring packing 19 inclusive, is being moved downwardly, thus partially collapsing bellows 15. The air contained in bellows 15, which is at the same pressure as the air tube 86 which connects to the top of the beer keg, is forced through orifice 23 raising ball check 22. The air then returns through lines 88, 87 and 86 into the top of the beer keg to partially replace the beer that has been drawn from the keg. This action prevents any increase in the air pressure inside of bellows 15.

Figures 1, 2, 3, 4:
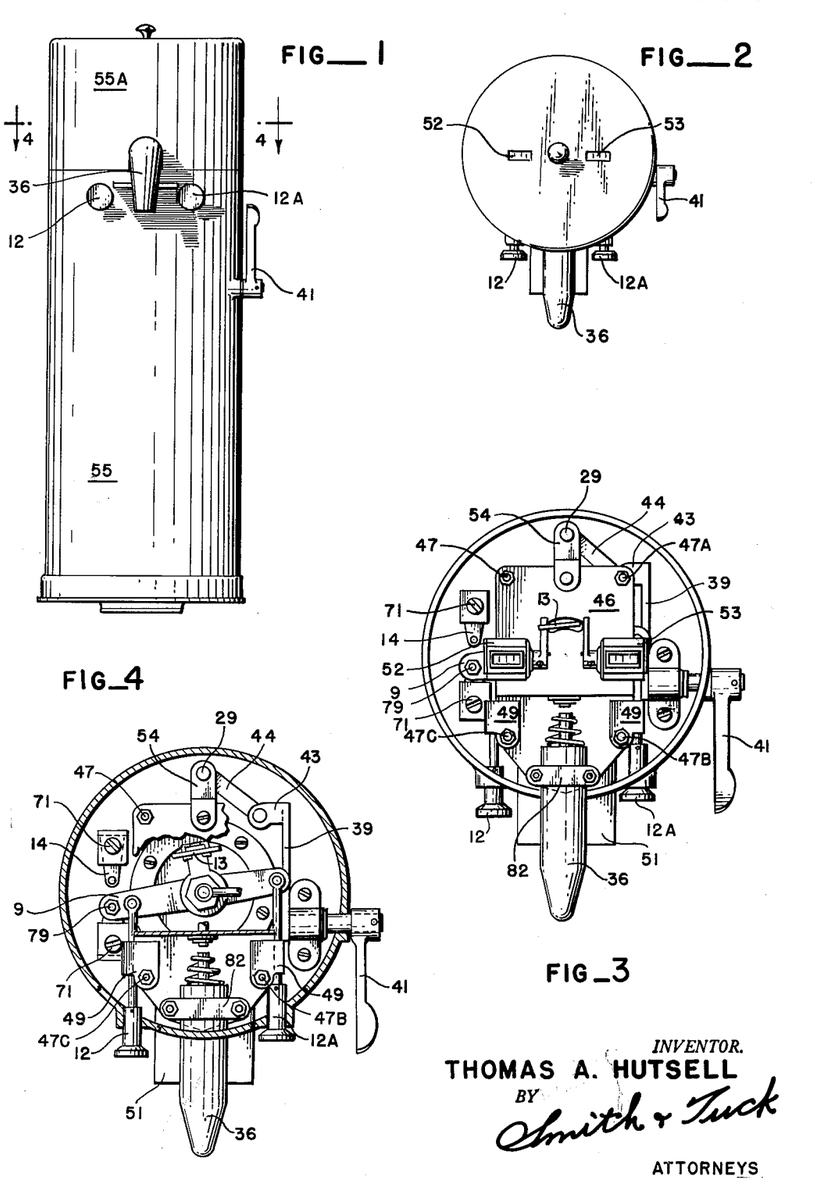
FIGURE 1 is a front elevation of my beer dispensing device taken from the operator's side of the device.
FIGURE 2 is a top plan view of the device of FIGURE 1.
FIGURE 3 is a top plan view of my device with the cover removed therefrom.
FIGURE 4 is a cross sectional view taken along the line 4—4 of FIGURE 1.

Diaphragm assembly 7 is also attached to piston stem 2a and in its downward travel therefore corresponds exactly to the travel of piston 2. Attached to diaphragm assembly 7 are the charging valve 8, the vent valve 10, the counter operating mechanism 13 and the shifting posts 11. Several functions are performed by the downward movement of these assemblies and in proper sequence these are as follows: first, valve 8 moves away from lever 51 allowing valve 8 to close thereby trapping the air under pressure behind diaphragms 7 and 37; the extension disposed on top of assembly 13 will intersect the lever of the counter over which it has been moved by one of the push buttons 12 or 12a, depending on the selection being made. The selection is usually determined by the small or large glass which is to be dispensed. It is shown to register with counter 52 in FIGURE 3. The downward movement will cause the counter to register one unit by the time the downward movement of the lever is stopped, by coming into contact with the plate 46. Any further downward movement will be compensated for by extending spring 83.

When the bottom of the slidable assembly 81, which is held onto the body of the body 10 by friction, intersects one of the quantity control stops 14 the assembly 81 will slide on the body of valve 10, thus opening and holding open vent valve 10. The result of this action will be the instant release of the air under pressure in diaphragm assemblies 7 and 37. As the combined efforts of spring 33 and 38 are many times stronger than that of spring 5 operating against diaphragm 7, diaphragm 37 will return and close outlet valve 32 stopping the discharge of beer before spring 5 can return diaphragm 7 and open bypass valve 4. It is now believed evident that opening vent valve 10, which is instantly followed by the closing of the beer outlet valve 32, will stop the discharge of beer at any position of the downward piston travel and as the relative position at which vent valve 10 is opened corresponds to the position where it comes in contact with quantity stop 14 it is believed evident that the quantity drawn on each discharge cycle can be predetermined and maintained. The position of the quantity stops 14 are easily set with the threaded adjusting tubes 71. These tubes are readily available for adjustment but do require the removal of the upper closure member 55a of the housing to prevent unauthorized changes of adjustment.

Figure 5:
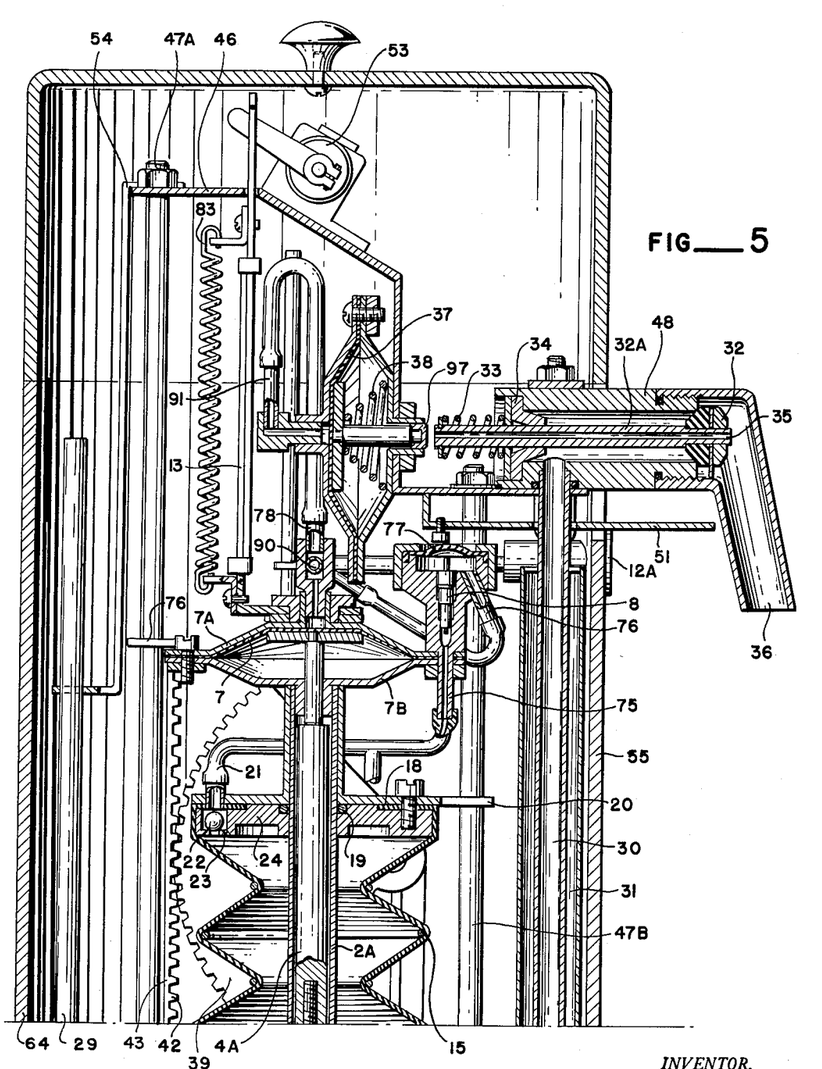
FIGURE 5 is a vertical cross sectional view through the upper portion of my dispensing device and taken along a plane through the dispensing nozzle thereof.
Figure 6:
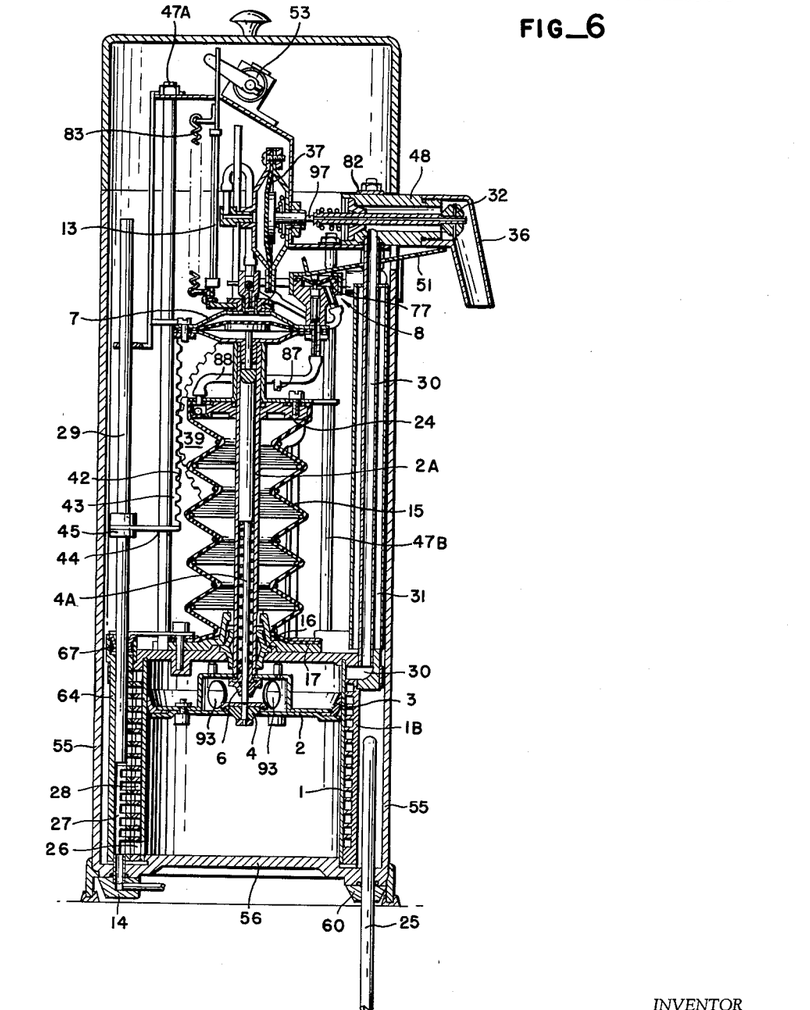
FIGURE 6 is a vertical cross sectional view taken in the same sense as FIGURE 5 but illustrating the entire device with the piston at its upper position.
Figure 7:
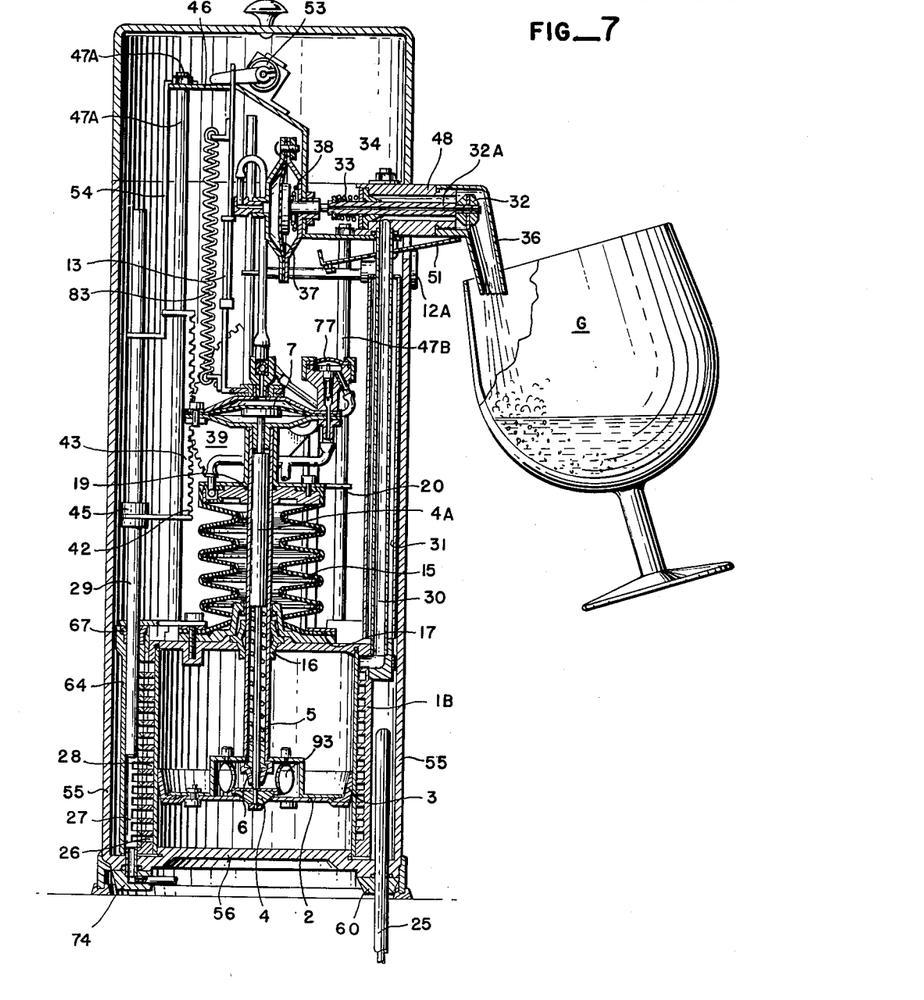
FIGURE 7 is a vertical cross sectional view similar to FIGURE 6 except that it shows the dispensing device in its dispensing cycle with the piston lowered.

After the outlet valve has been closed and the bypass valve opened, air pressure flowing through pressure regulator 84, through lines 85, 87 and 88, entering bellows 15 through the restricted orifice 23 will expand bellows 15 and return piston 2 together with all its related parts to a static position near the top of the metering chamber formed of cylinder 1. Because the flow of air is restricted by orifice 23, the speed of piston 2 is reduced sufficiently to materially reduce the turbulence of the beer passing through ports 93 and the opening of the bypass valve 4. As the piston is restored to its starting position a flange on the bottom of slide 81 intercepts an extension on bracket 68. This relationship is best illustrated in FIGURE 9 of the drawings. This action allows vent valve 10 to close and charging valve 8 has also been restored to its original position, as illustrated in FIGURE 5, where it can be operated by lever 51. This lever in turn is normally moved upwardly by the glass to be filled. While valve 32 is being held open vent passage 35 is sealed by being in contact with the end of diaphragm mechanism 97, shown in FIGURE 6. This contact air locks the nozzle 36 so the flow of beer from the nozzle to the glass is smooth and the beer is not aerated which would cause large bubbles in the foam, an undesirable condition. When the valve 32 is closed, air passes through this vent so no beer will remain in the discharge nozzle 36.

As previously noted the amount of foam formed on the beer when drawn is a function of its turbulence, normally associated with its temperature and pressure. Beer from the bottom of the metering cylinder enters passageway 28 through port 26 and rod guideway 27. Each complete turn or coil of this passage 28 is connected by a port to passageway 27 which has closely fitting in it the movable control rod 29. As this rod 29 is moved to the bottom of its travel all the connecting ports will be covered with the exception of the port at the extreme bottom which communicates with the beginning of the first turn of passageway 28. In this position beer ejected through port 26 would pass through the entire length of the passageway and enter tube 30 which is connected to the last half turn of the passageway. This setting, in which the beer is passed through the entire length of coil, would produce the minimum unit of foam on the beer drawn into the glass. As rod 29 is raised in guideway 27, the beer would pass through a decreasing length of the passageway, thus producing more foam on the beer in the glass. When the upward movement of rod 29 reaches the top of guideway 27, the beer would pass only through the enlarged half turn of the passageway connecting tube 30. Under this condition the minimum restriction would be placed on the flow of beer, from the bottom of metering cylinder through passageway 27, through the last half turn of the passageway through tube 30 and valve 32. This would produce the maximum amount of turbulence and consequently the maximum amount of foam. The movement of rod 29 in passage 27 is accomplished by the movement of lever 41, which is attached to gear sector 39 which in turn meshes with gears 42 on slide assembly 43.

The rack assembly, which is moved by the gear quadrant 39, is operatively connected by yoke 44 so that a movement of handle 41 can position rod 29 and thus give effective control of the foam formed on the beer as delivered.

It is believed that it will be clearly apparent from the above description and the disclosure in the drawings that the invention comprehends a novel construction of a beer dispenser.

Having thus disclosed the invention, I claim:

1. A beer dispenser of the type intended for the dispensing of accurately measured quantities of beer and depositing the beer in serving glasses under conditions of controlled turbulence to control foaming, comprising: a measuring cylinder having a substantial top and base and an intermediate cylinder wall of sheet material; a piston disposed for reciprocation in said cylinder and having a coaxial piston stem tube and bypass valve; fluid operated diaphragm means mounted upon said piston stem tube for sequential control of said bypass valve and a coaxially positioned valve stem operatively connecting said diaphragm means and said bypass valve; check valve disc secured on said piston stem and disposed for reciprocation with said piston and having a separate top plate removably secured thereto; a piston return fluid operated bellows disposed around said piston stem, secured at its bottom to the top of said cylinder and at its upper end between said valve disc; an annular passageway for beer disposed spirally around said measuring cylinder and utilizing the sheet material cylinder of said measuring cylinder as the inner wall of said passageway and means for varying the usable length thereof; cooling means for controlling the temperature of beer left in said cylinder and said passageway between dispensing periods; a beer discharge nozzle and a fluid actuated outlet valve therefor; a dispensing cycle counter and means connected to said piston disposed to operate said counter each time a serving of beer is drawn; a source of gas under pressure to operate said fluid pressure operated means; a charging valve means controlling the distribution of said gas under pressure.

2. In combination with the subject matter of claim 1, dispensing operation initiating lever pivoted intermediate its ends and having one end extending outwardly into proximity with said nozzle and positioned to be engaged by a serving container and initiate and continue the flow of beer through said nozzle into said container.

3. In combination with the subject matter of claim 2, said operating lever positioned so its inner end will contact said charging valve means connected to said source of gas under pressure and initiate and continue the flow of said gas for operating the beer dispensing means until the container is supplied a measured quantity of beer and foam and connecting passageways from said charging valve to said pressure operated means.

4. In combination with the subject matter of claim 2, a fluid pressure diaphragm actuated by said gas under pressure and providing means for opening said outlet valve and a spring returned means for controlling the closing of said outlet valve.

5. In combination with the subject matter of claim 4, a valve stem for said outlet valve positioned to operatively engage said fluid pressure diaphragm when fluid under pressure is applied to said diaphragm to open said discharge valve and drilled axially to provide vent means for said nozzle when said outlet valve is closed and the said diaphragm means is withdrawn from contact with said valve stem.

6. A beer dispenser of the type intended for the dispensing of accurately measured quantities of beer and depositing the beer in serving glasses under conditions of controlled turbulence to control foaming, comprising: a measuring cylinder having a substantial top and base and an intermediate cylinder wall of sheet material; a piston disposed for reciprocation in said cylinder and having a coaxial piston stem tube and bypass valve; fluid operated diaphragm means mounted upon said piston stem tube for sequential control of said bypass valve and a coaxially positioned valve stem operatively connecting said diaphragm means and said bypass valve; check valve disc secured on said piston stem and disposed for reciprocation with said piston and having a separate top plate removably secured thereto; a piston return fluid operated bellows disposed around said piston stem, secured at its bottom to the top of said cylinder and at its upper end between said valve disc; an annular passageway for beer disposed spirally around said measuring cylinder and utilizing the sheet material cylinder of said measuring cylinder as the inner wall of said passageway and means for varying the usable length thereof; cooling means for controlling the temperature of beer left in said cylinder and said passageway between dispensing periods; a beer discharge nozzle and a fluid actuated outlet valve therefor; a dispensing cycle counter and means connected to said piston disposed to operate said counter each time a serving of beer is drawn; a source of gas under pressure to operate said fluid pressure operated means; a charging valve means controlling the distribution of said gas under pressure; said means for varying the usable length of said annular passageway comprising, a beer supply tube connecting the beer supply source with the top of the metering cylinder above said piston; a cylindrical coil selector adjustment bore connecting with each turn of said spiral passageway and a reciprocating rod in said bore and means for positioning said rod to vary the number of turns of the spiral passageway blocked off and thus determine the number of turns available for use in reducing the turbulence of the beer as it is discharged.

7. A beer dispenser of the type intended for the dispensing of accurately measured quantities of beer and depositing the beer in serving glasses under conditions of controlled turbulence to control foaming, comprising: a measuring cylinder having a substantial top and base and an intermediate cylinder wall of sheet material; a piston disposed for reciprocation in said cylinder and having a coaxial piston stem tube and bypass valve; fluid operated diaphragm means mounted upon said piston stem tube for sequential control of said bypass valve and a coaxially positioned valve stem operatively connecting said diaphragm means and said bypass valve; check valve disc secured on said piston stem and disposed for reciprocation with said piston and having a separate top plate removably secured thereto; a piston return fluid operated bellows disposed around said piston stem, secured at its bottom to the top of said cylinder and at its upper end between said valve disc; an annular passageway for beer disposed spirally around said measuring cylinder and utilizing the sheet material cylinder of said measuring cylinder as the inner wall of said passageway and means for varying the usable length thereof; cooling means for controlling the temperature of beer left in said cylinder and said passageway between dispensing periods; a beer discharge nozzle and a fluid actuated outlet valve therefor; a dispensing cycle counter and means connected to said piston disposed to operate said counter each time a serving of beer is drawn; a source of gas under pressure to operate said fluid pressure operated means; a charging valve means controlling the distribution of said gas under pressure; a vent valve in the gas pressure line which supplies operational gas under pressure to the pressure actuated means which opens said piston bypass valve and said outlet valve against their individual spring bias and means for opening said vent valve thus allowing the spring bias of each valve to close said valves and stop the flow of beer.

References Cited in the file of this patent
UNITED STATES PATENTS

| | | |
|---|---|---|
| 2,151,110 | Hutsell | Mar. 21, 1939 |
| 2,382,059 | Hutsell | Aug. 14, 1945 |
| 2,680,477 | Schira | June 8, 1954 |
| 2,809,772 | Weisz | Oct. 15, 1957 |